United States Patent
Salamat et al.

(10) Patent No.: US 6,655,755 B2
(45) Date of Patent: *Dec. 2, 2003

(54) SYSTEM AND METHOD FOR ADAPTIVE BRAKE APPLICATION AND INITIAL SKID DETECTION

(75) Inventors: Bijan Salamat, Santa Clarita, CA (US); Robert D. Cook, Valencia, CA (US)

(73) Assignee: Hydro-Aire, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/973,297

(22) Filed: Oct. 9, 2001

(65) Prior Publication Data

US 2002/0014800 A1 Feb. 7, 2002

Related U.S. Application Data

(63) Continuation of application No. 09/591,093, filed on Jun. 8, 2000, now Pat. No. 6,299,262, which is a continuation of application No. 08/850,680, filed on May 2, 1997, now Pat. No. 6,132,016.

(51) Int. Cl.[7] .............................................. B60T 13/66
(52) U.S. Cl. ...................................... 303/155; 303/179
(58) Field of Search ................................ 303/178, 112, 303/135, 9.61, 187, 188, 198, 126, 156, 113.2, 122.07, 139, 140, 155, 166, DIG. 3, DIG. 4

(56) References Cited

U.S. PATENT DOCUMENTS

| | | |
|---|---|---|
| 3,574,417 A | 4/1971 | Howard et al. |
| 3,578,819 A | 5/1971 | Atkins |

(List continued on next page.)

FOREIGN PATENT DOCUMENTS

| | | | |
|---|---|---|---|
| DE | 42 43 245 A1 | *6/1994 | |
| EP | 231829 A3 | * | 8/1987 |
| EP | 378810 A1 | | 7/1990 |
| EP | 386939 A1 | | 9/1990 |
| EP | 426959 A3 | | 5/1991 |
| EP | 445575 A3 | | 9/1991 |
| EP | 575936 A1 | | 12/1993 |
| FR | 2637231 A3 | | 4/1990 |
| GB | 2 292 195 A | | 2/1996 |

OTHER PUBLICATIONS

US RE30,763, 10/1981, Hirzel et al. (withdrawn)

Motohiro, Igarashi, et al. Digital Brake Control System for Mag–lev Trains, presented at S'Tech '93 (International Conference on Speedup Technology for Railway and MAGLEV Vehicles), Nov. 1993, Yokohama, Japan.

Motohiro, Igarashi, et al. Digital Brake Control System for Mag–lev Trains, presented at S'Tech '93 (International Conference on Speedup Technology for Railway and MAGLEV Vehicles), Nov. 1993, Yokohama, Japan.*

Primary Examiner—Matthew C. Graham
(74) Attorney, Agent, or Firm—Fulwider Patton Lee & Utecht, LLP

(57) ABSTRACT

The adaptive brake application and initial skid detection system allows rapid brake application and prevents deep initial skids. Brake pressure is compared with a predetermined threshold brake pressure. Wheel velocity error signals are also generated to indicated the difference between the wheel velocity and a reference velocity signal. A pressure bias modulator integrator responsive to brake pressure signals adjusts the wheel velocity error signals to provide an anti-skid control signal. The pressure bias modulator integrator can also be initialized to the value of the measured brake pressure when the wheel velocity error signals indicate the beginning of a skid. Brake pressure difference signals are generated to indicate the difference between brake pressure and a commanded brake pressure, and an adjusted brake pressure error signal is generated in response to the brake pressure difference signals.

4 Claims, 2 Drawing Sheets

U.S. PATENT DOCUMENTS

| | | | |
|---|---|---|---|
| 3,587,798 A | 6/1971 | Schuman | |
| 3,604,760 A | 9/1971 | Atkins | |
| 3,614,174 A | 10/1971 | Romero | |
| 3,682,512 A | 8/1972 | Malon et al. | 303/93 |
| 3,702,714 A | 11/1972 | Branson | 303/93 |
| 3,711,163 A | 1/1973 | Booher | |
| 3,724,916 A * | 4/1973 | Hirzel | 303/178 |
| 3,829,167 A | 8/1974 | Rouf et al. | 244/111 |
| 3,955,652 A * | 5/1976 | Nilsson et al. | |
| 4,033,630 A * | 7/1977 | Hubbard | |
| 4,043,607 A | 8/1977 | Signorelli et al. | 303/112 |
| 4,105,258 A | 8/1978 | Bornfleth | 303/93 |
| 4,313,616 A * | 2/1982 | Howard | |
| 4,336,592 A * | 6/1982 | Beck | 303/166 |
| 4,412,291 A | 10/1983 | Amberg et al. | |
| 4,543,633 A * | 9/1985 | Cook | 303/178 |
| 4,768,840 A | 9/1988 | Sullivan et al. | 303/20 |
| RE33,486 E | 12/1990 | Hirzel et al. | |
| 5,312,168 A | 5/1994 | Breen | 303/9.61 |
| 5,390,990 A | 2/1995 | Cook | |
| 5,403,075 A * | 4/1995 | Fujioka | 303/166 |
| 5,507,568 A * | 4/1996 | Cook et al. | 303/135 |
| 5,605,387 A * | 2/1997 | Cook et al. | |
| 5,700,072 A * | 12/1997 | Cook et al. | 303/135 |
| 6,132,016 A * | 10/2000 | Salamat et al. | 303/178 |
| 6,299,262 B1 * | 10/2001 | Salamat et al. | 303/155 |

\* cited by examiner

SYSTEM AND METHOD FOR ADAPTIVE BRAKE APPLICATION AND INITIAL SKID DETECTION

This is a Continuation of Ser. No. 09/591,093 filed Jun. 8, 2000, now U.S. Pat. No. 6,299,262, which is a Continuation of Ser. No. 08/850,680, filed May 2, 1997, now U.S. Pat. No. 6,132,016.

BACKGROUND OF THE INVENTION

1. Field of the Invention

This invention relates generally to deceleration control systems for vehicles, and more particularly concerns an adaptive brake application and initial skid detection system for braking of one or more wheels of an aircraft during landing that prevents deep initial skids, and to thus allow rapid brake application in a controlled manner.

2. Description of the Related Art

Anti-skid and automatic braking systems commonly have been provided on commercial and large turbine aircraft to aid the deceleration of the aircraft upon landing. Modern anti-skid systems typically optimize braking efficiency by adapting to runway conditions and other factors affecting braking to maximize deceleration, corresponding to the level of brake pressure selected by the pilot. In conventional antiskid systems, brakes are typically applied mechanically via a metering valve by the pilot, and as soon as the wheel brake pressure approaches the skid level, such as when an initial skid is detected, a brake pressure value is used to initialize the antiskid control system. However, it has been found that the success of this method does can be affected by such factors as the mode of aircraft operation, aircraft weight, tire/runway interfaces, and the like. It would therefore be desirable to provide an adaptive brake application system that can adjust brake pressure or torque application to account for such factors.

Furthermore, rapid pedal application by an aircraft pilot also can often create deep initial skids before an effective antiskidding brake pressure or brake torque is determined and skidding is effectively controlled by conventional anti-skid and brake control systems. Eliminating or reducing initial skids would result in shorter aircraft stopping distances, which allow the aircraft to land on shorter runways, and can result in reduced tire wear. It would thus be desirable to provide an initial skid detection system to automatically anticipate initial skid conditions and adjust to prevent deep initial skids, to allow the pilot to depress the brake pedals at any rate, while still providing for rapid brake application in a controlled manner. The present invention provides an adaptive brake application and initial skid detection system that meets these needs.

SUMMARY OF THE INVENTION

Briefly, and in general terms, the present invention provides for an adaptive brake application and initial skid detection system that allows rapid brake application, while preventing deep initial skids, by implementation of a skid anticipation system that is initialized as soon as a wheel approaches a skid level to reduce brake application pressure or torque and to apply brakes in a controlled manner.

The invention accordingly provides for a "smart" brake application and initial skid detection system for braking of a wheel of an aircraft during landing. The system is applicable to one or more wheels having a wheel brake for applying brake torque to the wheel. A brake pressure sensor generates brake pressure signals that are a function of the braking pressure applied to the wheel brake, and the brake pressure signals are compared with a predetermined threshold brake pressure. A wheel speed transducer produces wheel speed signals that are a function of the rotational speed of the wheel, and a wheel velocity signal is generated based upon the wheel speed signals. The wheel velocity is compared with a reference velocity signal for generating wheel velocity error signals indicative of the difference between the aircraft wheel velocity signals and the reference velocity signal. A pressure bias modulator integrator is also provided that is responsive to brake pressure signals for adjusting the wheel velocity error signals to provide an anti-skid control signal, and in one currently preferred embodiment the pressure bias modulator integrator is initialized with the predetermined threshold brake pressure plus a predetermined constant pressure value. A command processor generates a command brake pressure signal generated in response to a deceleration command, and brake pressure comparison means are provided for comparing the brake pressure signals with the command brake pressure signal for generating brake pressure difference signals indicative of the difference between the brake pressure signals and the command brake pressure signal. Control means provide an adjusted brake pressure signal to the wheel brake to control the wheel brake independently of operator brake application, in response to the brake pressure difference signals. In another presently preferred embodiment, the pressure bias modulator integrator is initialized to the value of a measured brake pressure when the wheel velocity error signal indicates the beginning of a skid.

In a currently preferred embodiment, means are also provided for adjusting the brake pressure error signals by a proportional pressure gain, an integral pressure gain, and a differential pressure gain. In another presently preferred embodiment, transient control means for providing a proportional control signal and compensation network means, both responsive to the velocity error signal, are also provided, and the outputs of the transient control means and compensation network means are summed with the output of the pressure bias modulator integrator.

From the above, it can be seen that the present invention provides a system and method to initiate brake control after rapid application of the brake pedal, but before the onset of skidding occurs. These and other aspects and advantages of the invention will become apparent from the following detailed description and the accompanying drawings, which illustrate by way of example the features of the invention.

DETAILED DESCRIPTION OF THE PREFERRED EMBODIMENTS

Effectiveness of conventional antiskid systems can be affected by the mode of aircraft operation, aircraft weight, tire/runway interfaces, and similar factors. Rapid aircraft brake pedal application, especially panic application, can also create deep initial skids before antiskid control is initiated, resulting in lengthening of aircraft stopping distances and increased tire wear.

Figure 1:
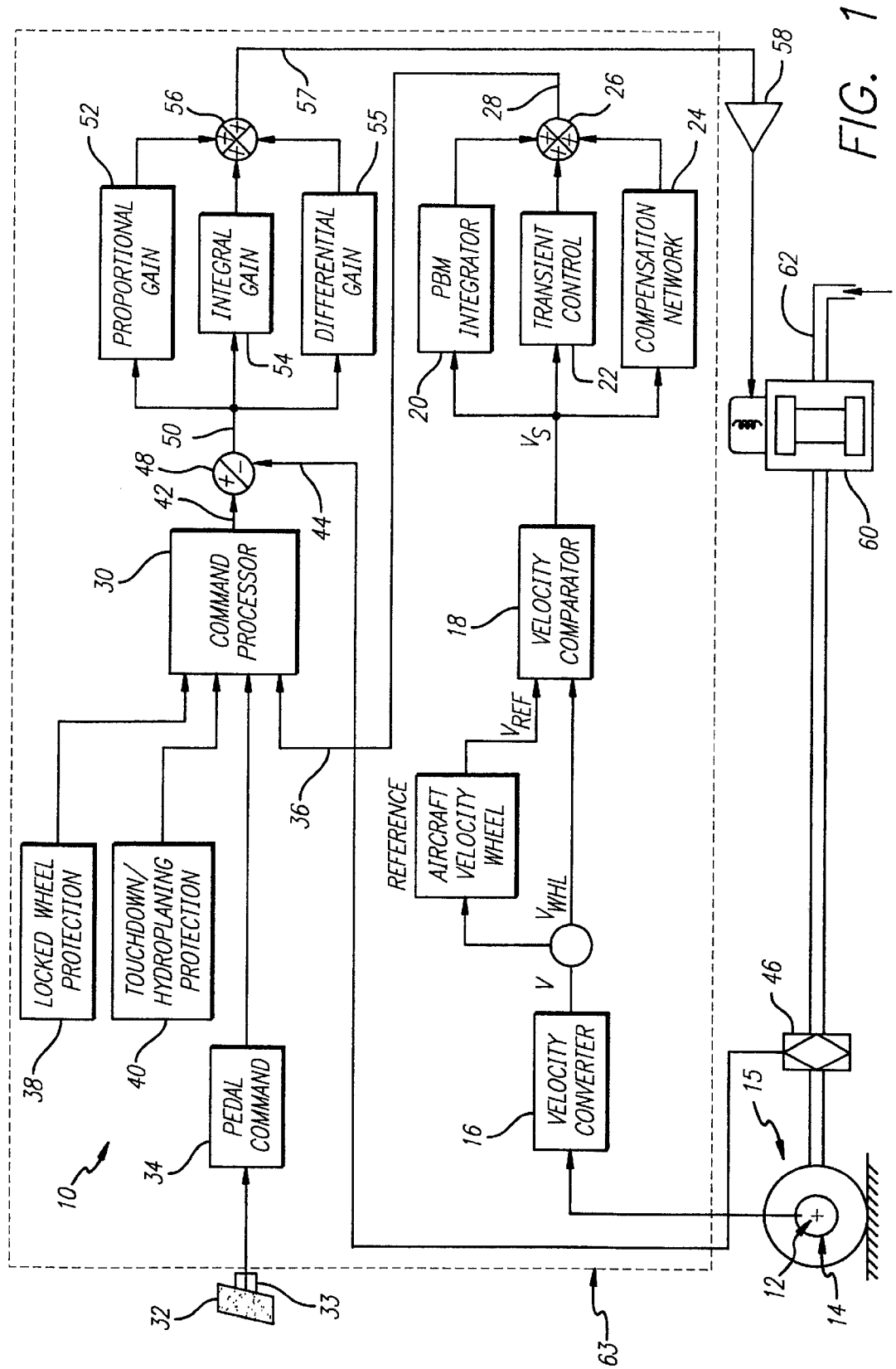
FIG. 1 is a schematic diagram of a "smart" brake application and initial skid detection system for an aircraft, according to the principles of the invention.

The present invention provides a system and method for direction of the conditions for the onset of skidding, and the initiation of brake control to prevent deep skids prior to controlled deceleration. With reference to FIG. 1, the invention is embodied in an adaptive, or "smart" brake application and initial skid detection system 10 which can be used in aircraft braking systems, and as installed for an aircraft preferably includes a wheel speed transducer 12 for each wheel brake 14 of a wheel 15 of the aircraft, for measuring wheel speed and generating wheel speed signals that are a function of the rotational speed of the brake wheel. The wheel speed signal is typically converted to a signal representing the velocity of the aircraft by a velocity converter 16, and compared with a desired reference velocity in velocity comparator 18, to generate wheel velocity error signals indicative of the difference between the wheel velocity signals from each braked wheel and the reference velocity signal. The output of the velocity comparator is referred to as slip velocity (Vs) or velocity error. The velocity error signals are adjusted by a pressure bias modulator control means (PBM) integrator 20, the transient control means 22, and compensation network 24, the outputs of which are summed at summing junction 26 to provide an anti-skid control signal 28 received by the command processor 30, typically a microprocessor. The PBM integrator in the antiskid loop dictates the maximum allowable control pressure level during braking. The PBM integrator is typically slower in response than other control parameters needed to detect and control initial skid. When no skid is detected, this integrator allows full system pressure to the brakes.

The position of the aircraft brake pedal 32 operated by the pilot is typically read by a microcontroller 33 that generates a brake pedal command signal 34, from which a pressure application profile is determined. The command processor 30 receives the brake pedal command signal, the anti-skid control signal 28 via feedback line 36, and preferably also receives a locked wheel protection signal 38 indicating whether a wheel is locked, and a touchdown/hydroplaning protection signal 40, to guard against hydroplaning of a wheel on touchdown at high speeds. In a currently preferred embodiment, the command processor operates on the lowest input of the locked wheel protection signal, the touchdown protection signal, the pedal signal, and the antiskid signal. The commanded brake pressure signal output 42 of the command processor is compared with the brake pressure feedback signal 44 from brake pressure sensor 46 by comparator 48, which generates an output pressure error signal 50.

In a currently preferred embodiment, the brake pressure error signals are also adjusted by a proportional gain by proportional gain circuitry 52, an integral gain by integral gain circuitry 54, and a differential gain by differential gain circuitry 55 that together form a PID control loop, and the outputs of which are summed at summing junction 56 to provide an adjusted brake pressure signal 57. The adjusted brake pressure signal is also typically amplified by valve amplifier 58 to provide an amplified brake control signal applied to the brake control valve 60 that controls the application of pressurized brake fluid from system pressure 62 to the wheel brake.

In a presently preferred embodiment, the functions of the elements in the block 63 are performed by one or more microprocessors under appropriate software control, although alternatively these or analogous functions may be performed by suitable hardware components. It will be appreciated by those skilled in the art that the component parameters and configurations will vary from aircraft to aircraft and that there is thus wide variability in how the system can be used.

"Smart" Brake Application

Figure 2:
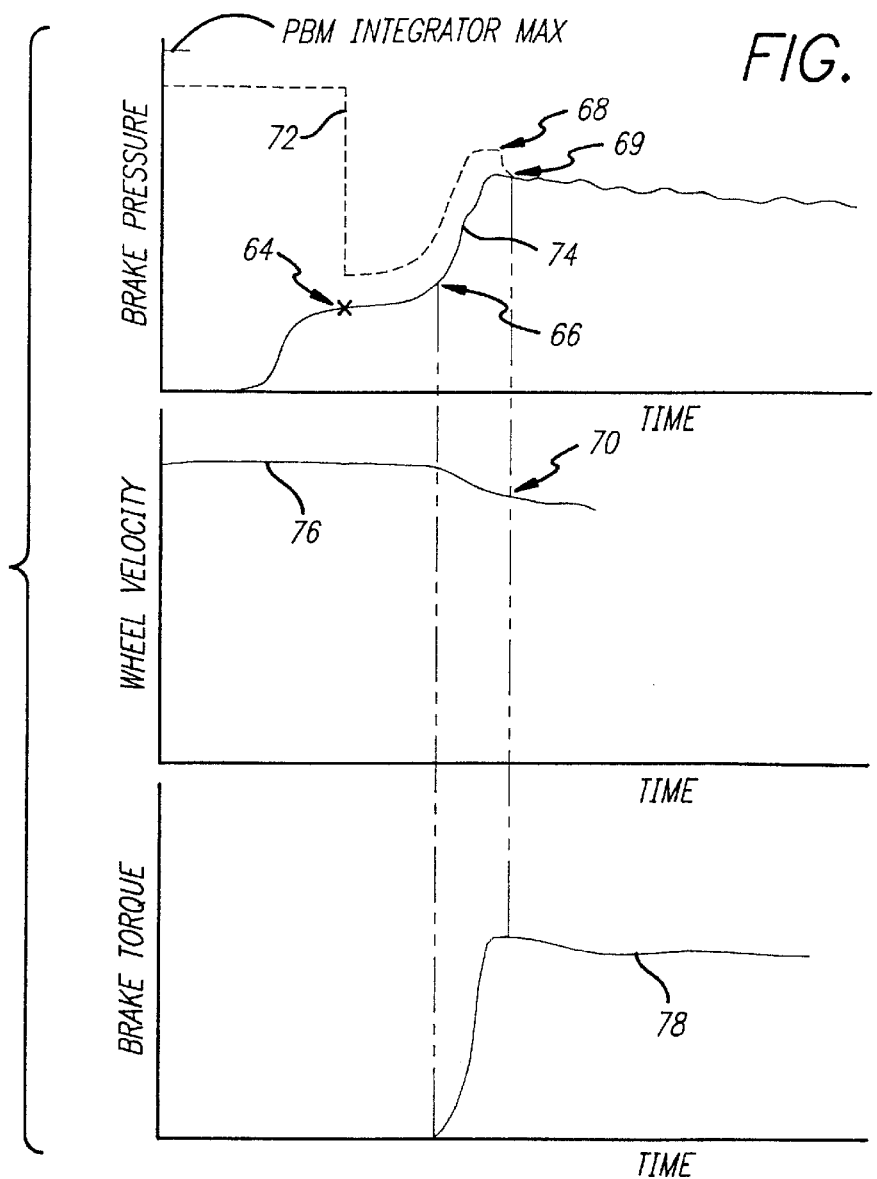
FIG. 2 shows two charts relating brake pressure, wheel velocity and brake torque over time for the "smart" brake application and initial skid detection system of the invention.
Figure 3:
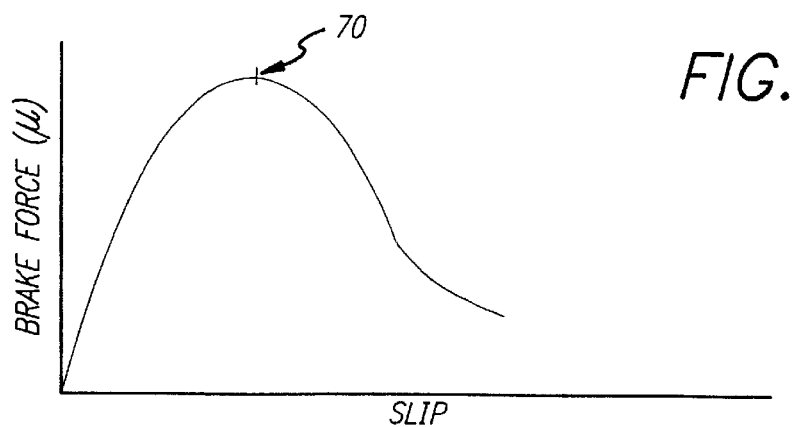
FIG. 3 is a chart illustrating the brake pressure to brake slip curve for the "smart" brake application and initial skid detection system of the invention.

Referring to FIG. 2, brake application is allowed without any rate limiting until brake pressure is detected at a preset value 64, typically near the brake contact pressure 66, at which point the brake torque commences to rise. Then the PBM integrator is initialized to the preset brake pressure value plus a predetermined constant increment of pressure, at 68, which corresponds to the peak of the brake pressure-slip curve 70 shown in FIGS. 2 and 3. The output of the PBM integrator is shown as dotted line 72, and the commanded brake pressure output is shown as line 74. The wheel velocity is shown as line 76, and brake torque is shown as line 78. As is illustrated in FIG. 2, the initialization of the PBM integrator forces the PBM integrator to track the brake application profile beginning at 69, thus preventing any substantial overshoot.

"Smart" Skid Detection

When a wheel approaches the skid level, such as when Vs is detected to be greater than the preset wheel velocity limit, then the PBM integrator is initialized with the value of brake pressure feedback at the time that Vs is greater than the preset limit. This method ensures correct initialization of the PBM integrator. The brake pressure at the time of an initial skid is what the PBM integrator needs to be for the immediate control without multiple initial skids. Therefore a fast response of the PBM integrator is insured to an otherwise slow moving control function.

It should be apparent that this invention is not limited to velocity error type systems, and that the invention is also applicable to other brake control skid detection concepts, such as rate control/detection, as well as any system that monitors the brake application and pressure or torque.

From the above, it will be recognized by those skilled in the art that the present invention provides a new and novel method and apparatus to indicate brake control prior to the initialization of skids and to prevent overshoot and instability after brake control is begun.

It will also be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In an adaptive brake application and initial skid detection system for braking of a wheel of a vehicle, the vehicle having a braking system including a wheel brake for applying brake pressure to the wheel; wheel velocity signal generating means for producing a wheel velocity signal that is a function of the rotational speed of the wheel; and command brake pressure signal generating means for generating a command brake pressure signal in response to a deceleration command, the improvement comprising:

wheel velocity comparison means for determining the beginning of a skid based upon the wheel velocity signal;

a brake pressure sensor for sensing a maximum allowable brake pressure when the beginning of a skid is determined by the wheel velocity comparison means; and means for controlling the command brake pressure signal generating means to limit the brake pressure to the maximum allowable brake pressure, the means for controlling the command brake pressure signal generating means including a pressure bias modulator integrator, and means for initializing the pressure bias modulator integrator to the maximum allowable brake pressure when the wheel velocity signal exceeds a reference velocity signal.

2. The adaptive brake application and initial skid detection system of claim 1, further comprising: transient control means and compensation network means, the transient control means and compensation network means having outputs which are summed with an output of the pressure bias modulator integrator.

3. In a method for detecting initial skidding and applying brake pressure for braking of a wheel of an aircraft during landing of the aircraft, the aircraft having a wheel brake for applying brake pressure to said wheel, the method including the steps of wheel generating a wheel velocity signal that is a function of the rotational speed of the wheel, and generating a command brake pressure signal in response to a deceleration command, the improvement in the method comprising the steps of:

determining the beginning of a skid based upon the wheel velocity signal;

sensing a maximum allowable brake pressure when the beginning of a skid is determined;

limiting the brake pressure to the maximum allowable brake pressure by initializing a pressure bias modulator integrator to the maximum allowable brake pressure when the wheel velocity signal exceeds a reference velocity signal.

4. The method of claim 3, further comprising providing transient control means and compensation network means, and summing outputs of the transient control means and compensation network means with an output of the pressure bias modulator integrator.

* * * * *